(12) United States Patent  
Shintani

(10) Patent No.: US 7,847,985 B2
(45) Date of Patent: Dec. 7, 2010

(54) IMAGE-READING APPARATUS AND METHOD

(75) Inventor: Kazuaki Shintani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 433 days.

(21) Appl. No.: 12/053,014

(22) Filed: Mar. 21, 2008

(65) Prior Publication Data

US 2008/0265033 A1 Oct. 30, 2008

(30) Foreign Application Priority Data

Apr. 27, 2007 (JP) ............................. 2007-118039

(51) Int. Cl.
*H04N 1/04* (2006.01)

(52) U.S. Cl. ...................... 358/475; 358/461; 358/474; 358/496

(58) Field of Classification Search ................ 358/475, 358/461, 474, 496, 497, 498
See application file for complete search history.

(56) References Cited

FOREIGN PATENT DOCUMENTS

JP 2004165787 6/2004

*Primary Examiner*—Houshang Safaipour
(74) *Attorney, Agent, or Firm*—Gauthier & Connors LLP

(57) ABSTRACT

An image-reading apparatus includes a first light-receiving device that receives light reflected from a sheet, a second light-receiving device disposed a predetermined distance from the first light-receiving device along a sheet-transfer direction, a first lighting unit that illuminates a readout position to be read by the first light-receiving device, a second lighting unit that illuminates a readout position to be read by the second light-receiving device, a delay unit that delays one of a first signal output from the first light-receiving device and a second signal output from the second light-receiving device, a correction signal generation unit that generates a correction signal by reference to a difference between the first signal and the second signal, one of which has been delayed by the delay unit, and a correcting unit that corrects for at least one of the first signal and the second signal by using the correction signal.

8 Claims, 17 Drawing Sheets

| AMPLITUDE\PERIOD | a | b | ..... |
|---|---|---|---|
| α | PATTERNaα | PATTERNbα | ..... |
| β | PATTERNaβ | PATTERNbβ | ..... |
| ..... | ..... | ..... | ..... |

…

IMAGE-READING APPARATUS AND METHOD

CROSS-REFERENCE TO RELATED APPLICATIONS

This application is based on and claims priority under 35 USC 119 from Japanese Patent Application No. 2007-118039, filed on Apr. 27, 2007.

BACKGROUND

1. Technical Field

The present invention relates to an image-reading apparatus and method.

2. Related Art

In an image-reading apparatus, there may be cases where, while a sheet which is an object to be read is being transferred, the sheet is unintentionally deflected or flexed. Upon occurrence of such flexural deformation (or irregularities), a distance between an image sensor such as a CCD (Charge Coupled Device) and a surface of the sheet varies from region to region on the sheet, which causes the magnitude of an output signal from the image sensor to vary among the regions of the sheet even though the sheet has uniform density on its entire surface. When flexural deformation occurs as described above, the output signal from the image sensor deviates from proper values that match the image densities of the sheet surface.

Conventionally, as measures to prevent the above-described flexural deformation during transfer, a guide face for guiding the sheet is provided to thereby mechanically reduce the occurrence of flexural deformation. However, because such mechanical measures are incapable of effectively preventing minute flexural deformation or other flexure, the mechanical measures are not necessarily satisfactory in preventing the occurrence of flexure.

SUMMARY

In an aspect of the present invention, there is provided an image-reading apparatus including a sheet transfer unit that transfers a sheet, a first light-receiving device that receives light reflected from the sheet, a second light-receiving device disposed a predetermined distance from the first light-receiving device along a transfer direction in which the transfer unit transfers the sheet, a first lighting unit that illuminates a readout position to be read by the first light-receiving device at a first ratio between an intensity of illumination from one side along the transfer direction and an intensity of illumination from the other side along the transfer direction, a second lighting unit that illuminates a readout position to be read by the second light-receiving device at a ratio, which differs from the first ratio, between an intensity of illumination from one side along the transfer direction and an intensity of illumination from the other side along the transfer direction, a delay unit that delays one of a first signal which is output from the first light-receiving device and a second signal which is output from the second light-receiving device to correct a delay caused by a displacement between the readout position associated with the first signal and the readout position associated with the second signal, a correction signal generation unit that generates a correction signal by reference to a difference between the first signal and the second signal, one of which has been delayed by the delay unit, and a correcting unit that corrects for at least one of the first signal and the second signal using the correction signal generated by the correction signal generation unit.

BRIEF DESCRIPTION OF THE DRAWINGS

An exemplary embodiment of the present invention will be described in detail by reference to the following figures, wherein.

DETAILED DESCRIPTION

Figure 1:
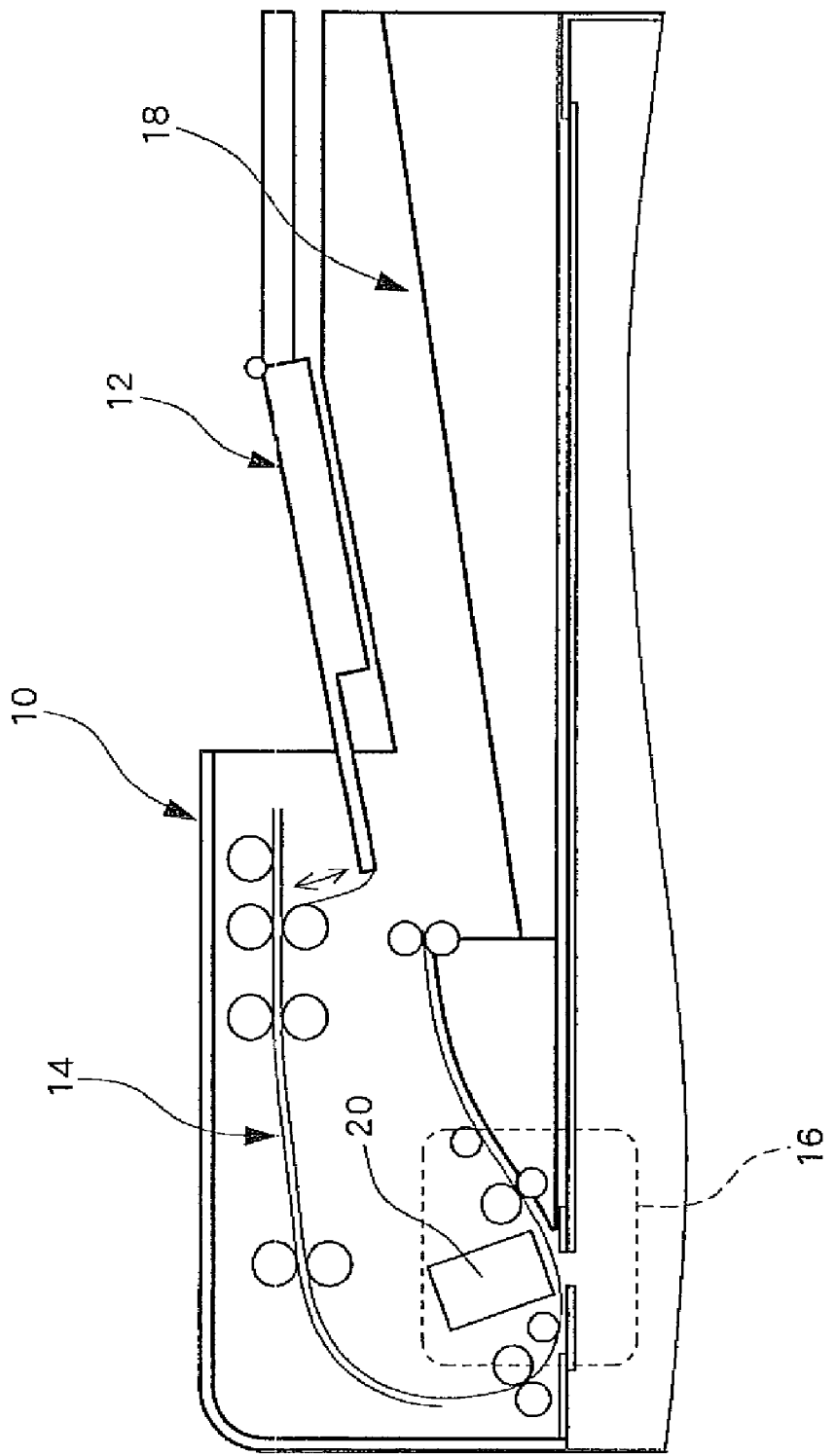
FIG. 1 schematically shows an example configuration of a sheet transfer system in an image-reading apparatus.

Devices such as a discrete scanner device and a scanner incorporated in a copier machine are known as examples of an image-reading apparatus for reading an image on a surface of a document sheet. As an example of such devices, FIG. 1 schematically shows an image-reading apparatus 10 to be mounted on a top part of a copier machine. In this example, the image-reading apparatus 10 has an automatic document feeding function, in which a sheet placed on a document input tray 12 is transferred to a readout section 16 by means of a transfer mechanism 14. In the readout section 16, a sensor unit 20 is provided to read a top surface of the sheet. The sensor unit 20 is a contact-type sensor. The read sheet is ejected to a document output tray 18.

Figure 2:
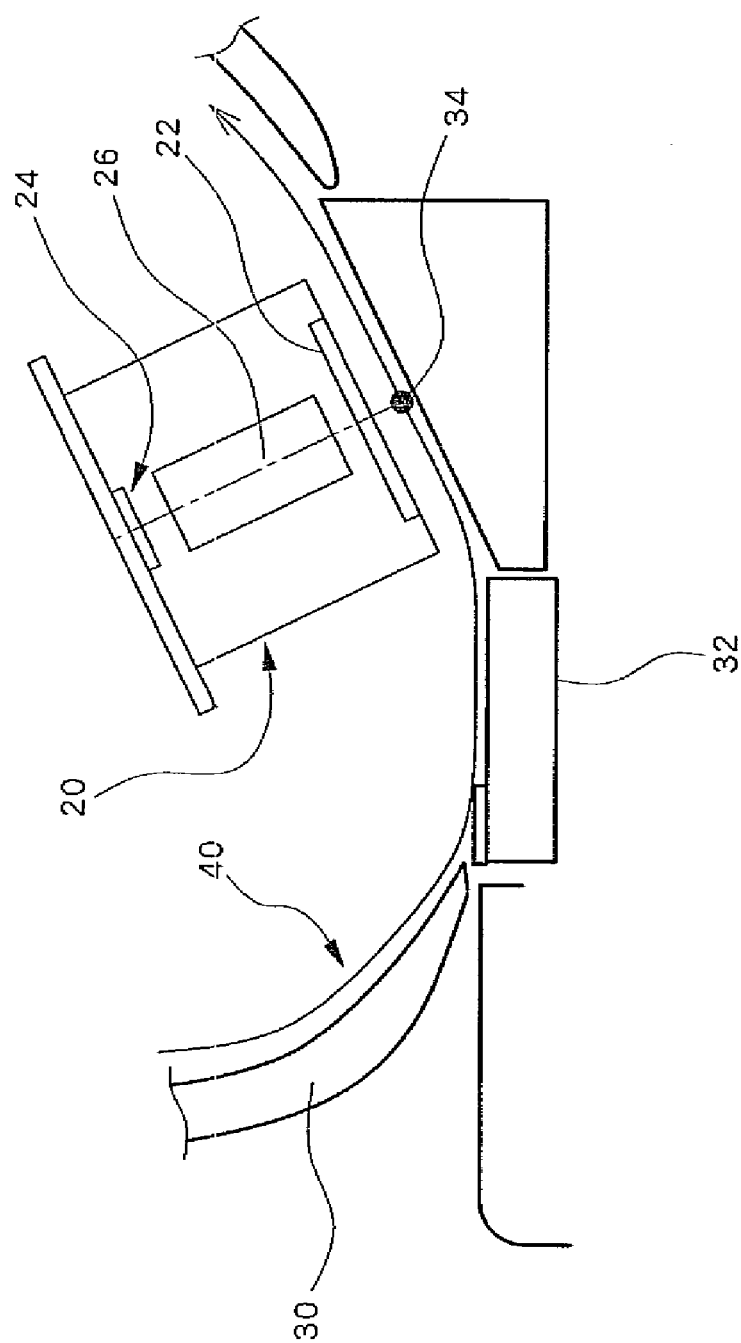
FIG. 2 schematically shows a detailed example configuration of a sensor unit in the image-reading apparatus.

FIG. 2 shows an example detailed configuration of the readout section 16. The illustrated sensor unit 20 internally includes a glass filter 22, a line sensor 24 which extends in a direction perpendicular to the drawing of FIG. 2, and an image-forming optical system 26, such as a graded index lens, in which reflection light from a surface of the sheet having passed through the glass filter 22 is directed to form an image onto a light-receiving surface of the line sensor 24. The sensor unit 20 internally includes a light source for illuminating the sheet surface, which is not illustrated in FIG. 2. A sheet 40 transferred by the transfer mechanism 14 is guided into the readout section 16 by means of a sheet-guiding unit 30. In the readout section 16, a contact glass 32 for reading the underside of the sheet 40 is provided, and the above-described sensor unit 20 is disposed downstream from the contact glass 32. The reflected light from the sheet surface located at a focal point 34 of the sensor unit 20 is caused to produce an image onto the line sensor 24 by the image-forming optical system 26. The sensor unit 20 shown in FIG. 2 is a conventionally adopted contact-type sensor unit.

Figure 3:
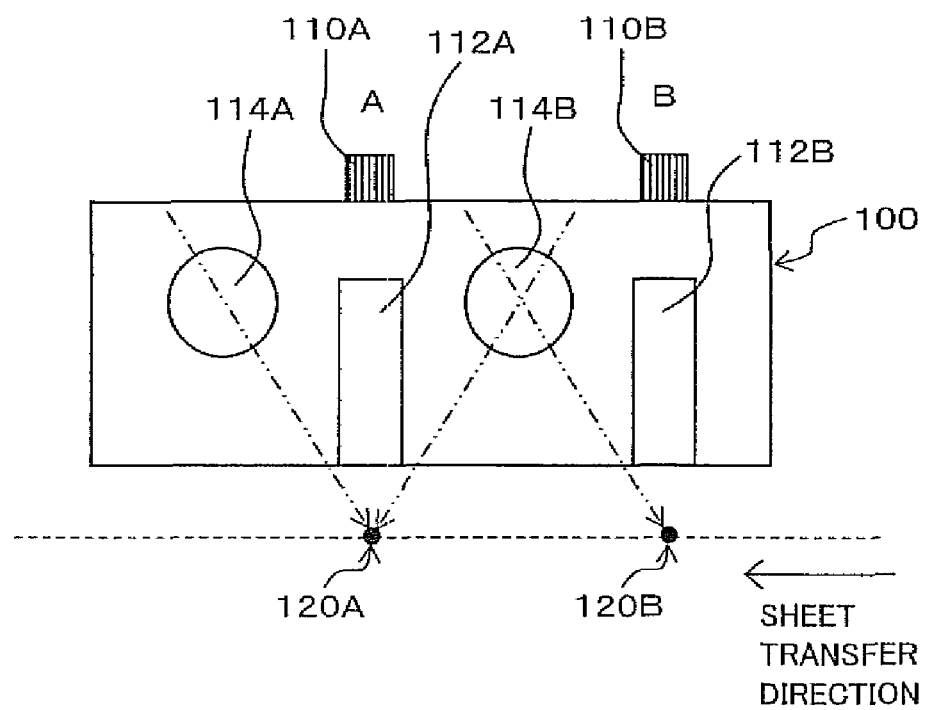
FIG. 3 schematically shows an example configuration of a readout sensor unit according to an exemplary embodiment of the present invention.

Next, with reference to FIG. 3, a configuration of a sensor unit 100 used in an exemplary embodiment of the present invention will be described. FIG. 3 schematically shows a characteristic part of the sensor unit 100 without illustrating details thereof.

This sensor unit 100 is used in place of the sensor unit 20 in, for example, the image-reading apparatus as shown in FIGS. 1 and 2. The sensor unit 100 includes two line sensors 110A and 110B which are spaced apart from each other in a sheet transfer direction. Each of the line sensors 110A and 110B has light-receiving elements arranged in an array along a direction perpendicular to the drawing of FIG. 3. In other words, an array direction of the light-receiving elements in the line sensors 110A and 110B is perpendicular to the sheet transfer direction. During readout, each of the line sensors 110A and 110B sequentially outputs output signals from the respective light-receiving elements, from one end of the array to the other end of the array. This processing is fast scanning in readout processing. Meanwhile, the sheet transfer direction corresponds to a slow scan direction in readout processing.

The sensor unit 100 further includes an image-forming optical system 112A for the line sensor 110A and an image-forming optical system 112B for the line sensor 110B. The image-forming optical systems 112A and 112B have, for example, graded index lenses in which light reflected from focal points 120A and 120B on the sheet surface is directed to form images on the line sensors 110A and 110B, respectively.

In addition, the sensor unit 100 includes two light sources 114A and 114B. One light source 114B is positioned between the line sensors 110A and 110B in the sheet transfer direction. The other light source 114A is located downstream from the line sensor 110A in the sheet transfer direction. Because the sheet surface is brought into substantially absolute contact with the sensor unit 100, light emitted from the light source 114A does not reach the focal point 120B of the line sensor 110B. Accordingly, the focal point 120B is illuminated from a single side (with respect to the sheet transfer direction) by the one light source 114B. In contrast, the focal point 120A is illuminated from both sides of the focal point 120A by the two light sources 114A and 114B. Here, for clarity of description, a luminous intensity of the light source 114A is defined as being equal to that of the light source 114B.

Next, by reference to FIGS. 4 and 5, there will be described changes in respective output signals from the line sensors 110A and 110B arising along the slow scan direction when a flat sheet surface having no flexural deformation (irregularities) is read. In the below description, for the sake of simplicity, each of the line sensors 110A and 110B is assumed to be a black-and-white (gray scale) sensor. However, in principle, color sensors are handled in a similar manner as described below.

Figure 4:
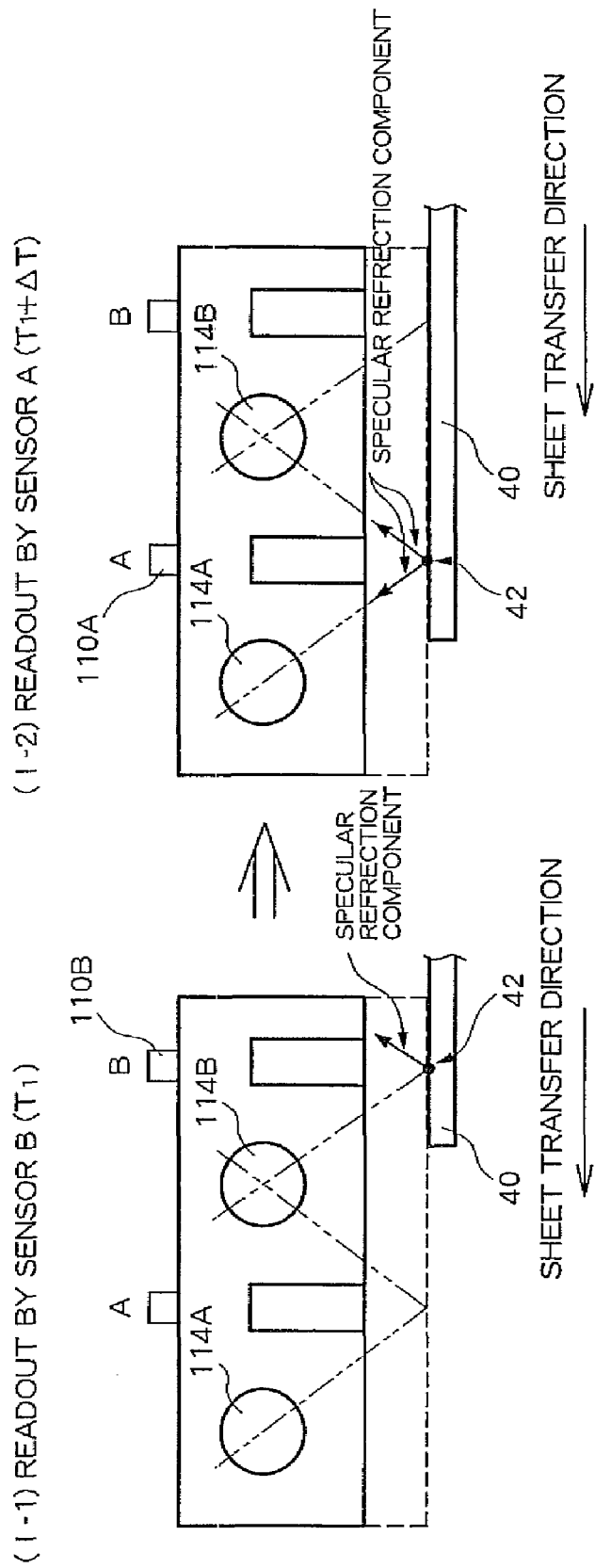
FIG. 4 is a diagram for explaining an illumination state in which a flat region on a document sheet is read by each sensor in the readout sensor unit.

FIG. 4 shows a schematic side view of a situation in which the sensor unit 100 reads a sheet being transferred from a right side to a left side in the drawing. As shown in FIG. 4, a flat region 42 present on a surface of the sheet 40 being transferred is read at a time $T_1$ (a state I-1) by the line sensor 110B. Then, when a time period $\Delta T$ has elapsed (in a state I-2), the same flat region 42 is read by the line sensor 110A. The time period $\Delta T$ denotes a length of time required to transfer the sheet 40 by a distance from the focal point 120B to the focal point 120A (refer to FIG. 3).

The focal point of the line sensor 110A is illuminated from both sides by the light sources 114A and 114B, whereas the focal point of the line sensor 110B is illuminated only by the light source 114B. Therefore, when the same location of the sheet is read, the level (magnitude) of the output signal of the line sensor 110A is greater than that of the line sensor 110B. However, the levels of the output signals of the line sensors 110A and 110B obtained when the same location of the sheet is read can be tuned to the same level by adjusting a gain of each amplifier for amplifying the output signals of the line sensors 110A and 110B to thereby perform shading compensation. Unless otherwise specified, the description "output signals of the line sensors 110A and 110B" will hereinafter refer to the signals whose levels are adjusted as described above.

Figure 5:
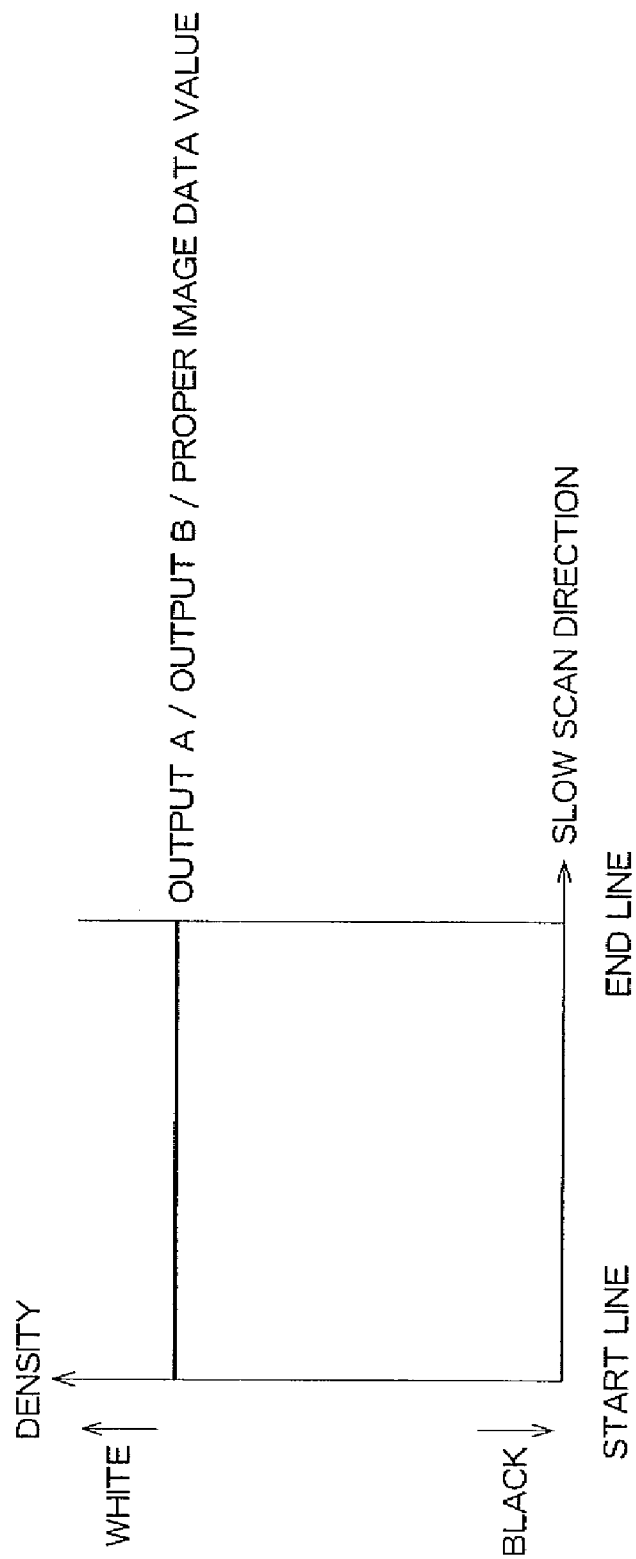
FIG. 5 schematically shows a pattern of change of an output signal from each sensor in the readout sensor unit arising along a slow scan direction when a sheet having no flexural deformation is read.

As shown in FIG. 5, when the image-reading apparatus in which level adjustment is performed as described above is caused to read a monochrome document sheet, for example, over the entire surface of the sheet, the output signal of the line sensor 110A and the output signal of the line sensor 110B have the same value from a start line to an end line of the sub-scanning or slow scanning. When the sheet surface on which light and shade pattern are present is flat, the output signals of the line sensor 110A and the line sensor 110B have equal values which represent the light and shade pattern (i.e. an image) on the sheet surface.

It should be noted that, in explanations provided above and below, the description "an output signal of a line sensor" is used to denote a signal which is output from one light-receiving element or signals which are output from one group of light-receiving elements in the line sensor. Further, comparison between the output signal of the line sensor 110A and the output signal of the line sensor 110B denotes comparison between their respective output signals output from one light-receiving element or one group of light-receiving elements having read the same location on a sheet (i.e. the light-receiving elements present at the same location on the sheet in the fast scan direction).

Next, illumination states in which a flexural region of the sheet is read by the line sensors 110A and 110B will be described with reference to FIGS. 6 to 8. In examples of FIGS. 6 to 8, because the sheet 40 is transferred from the right side to the left side, a specific part of the sheet 40 having been read by a light-receiving element in the line sensor 110B situated on the right side is read after $\Delta T$ seconds by a light-receiving element in the line sensor 110A which is present at a location corresponding to the light-receiving element in the line sensor 110B.

Figure 6:
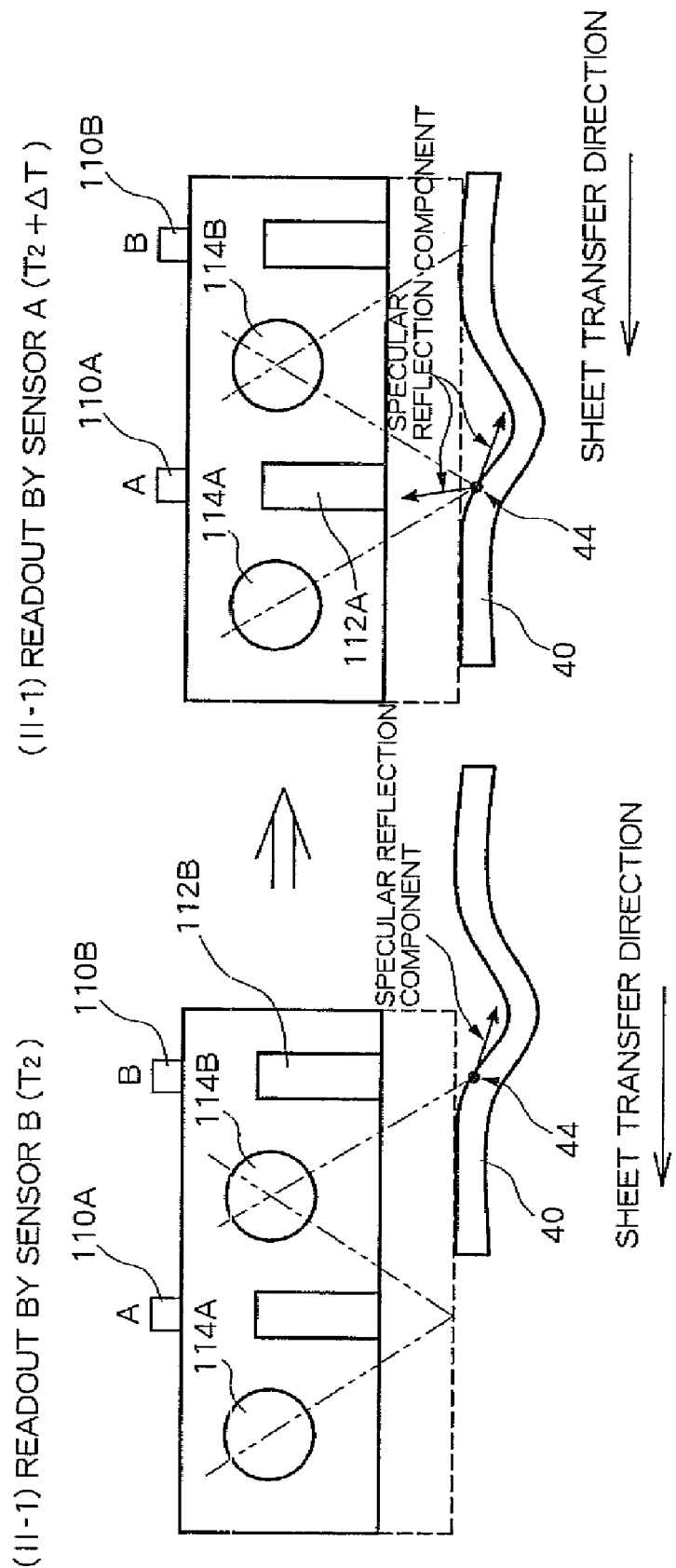
FIG. 6 is a diagram for explaining an illumination state in which a leading edge of a flexural region on a sheet is read by each sensor.

FIG. 6 is a diagram for explaining an illumination state in which a leading edge 44 of the flexural region is read. The leading edge 44 of the flexural region refers to one side of both ends of the flexural region which is initially read in the course of transfer of the sheet 40.

At a time $T_2$ (a state II-1), the leading edge 44 reaches a position to be read by the line sensor 110B. At this time, a specular reflection component of light from the light source 114B obtained on a surface of the leading edge 44 travels in a direction which is considerably distant from the image-forming optical system 112B as shown in FIG. 6. Although reflection from the sheet surface includes components other than the specular reflection component, a specular direction has the greatest intensity in the intensity distribution, and the intensity becomes lower with increasing distance from the specular direction. Therefore, in the state II-1, the level of the output signal of the line sensor 110B is considerably lower than that of the output signal obtained by reading the same location of a flat sheet.

Meanwhile, when the time ΔT has elapsed (a state II-2), the leading edge 44 reaches a position to be read by the line sensor 110A. At this time, a specular reflection component of light from the light source 114A obtained on the surface of the leading edge 44 also travels in a direction which is considerably distant from the image-forming optical system 112A, whereas a specular reflection component of light from the other light source 114B is directed more closely toward the image-forming optical system 112A than that which is directed upon reading of the flat region. Accordingly, in the state II-2, although the level of the output signal of the line sensor 110A is still lower than a signal level in the case of the flat sheet, the extent of the level lowering is smaller than the extent to which the level of the output signal of the line sensor 110B is reduced in the state II-1.

Figure 7:
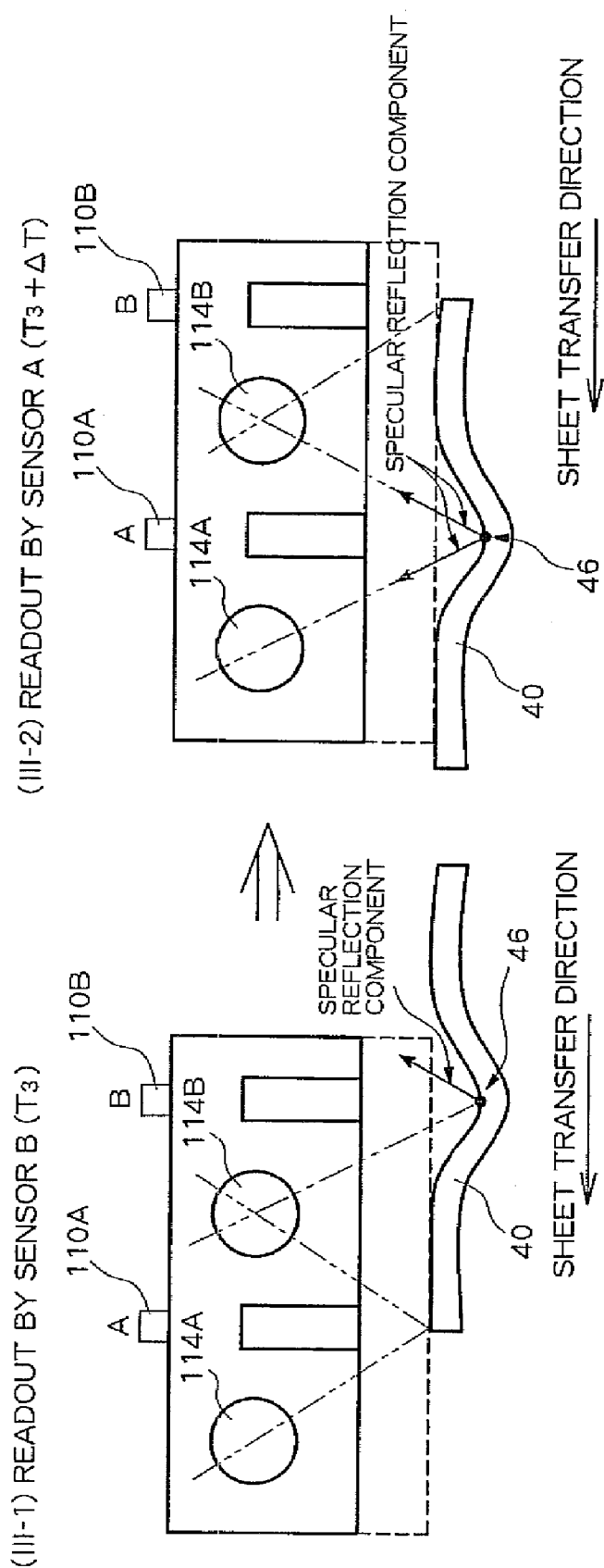
FIG. 7 is a diagram for explaining an illumination state in which a midsection of the flexural region on the sheet is read by each sensor.

FIG. 7 shows an illumination state in which a midsection 46 of the flexural region is read after a certain time has elapsed. Because the midsection 46 is a bottom of the flexural region, the specular reflection component of illuminated light travels along a direction identical with that of the specular reflection component obtained on the flat region shown in FIG. 4 both in a state III-1 where the midsection 46 is read by the line sensor 110B and in a state III-2 where the midsection 46 is read by the line sensor 110A. Therefore, the output signals of the line sensors 110A and 110B obtained when the midsection 46 is read have the same level.

Figure 8:
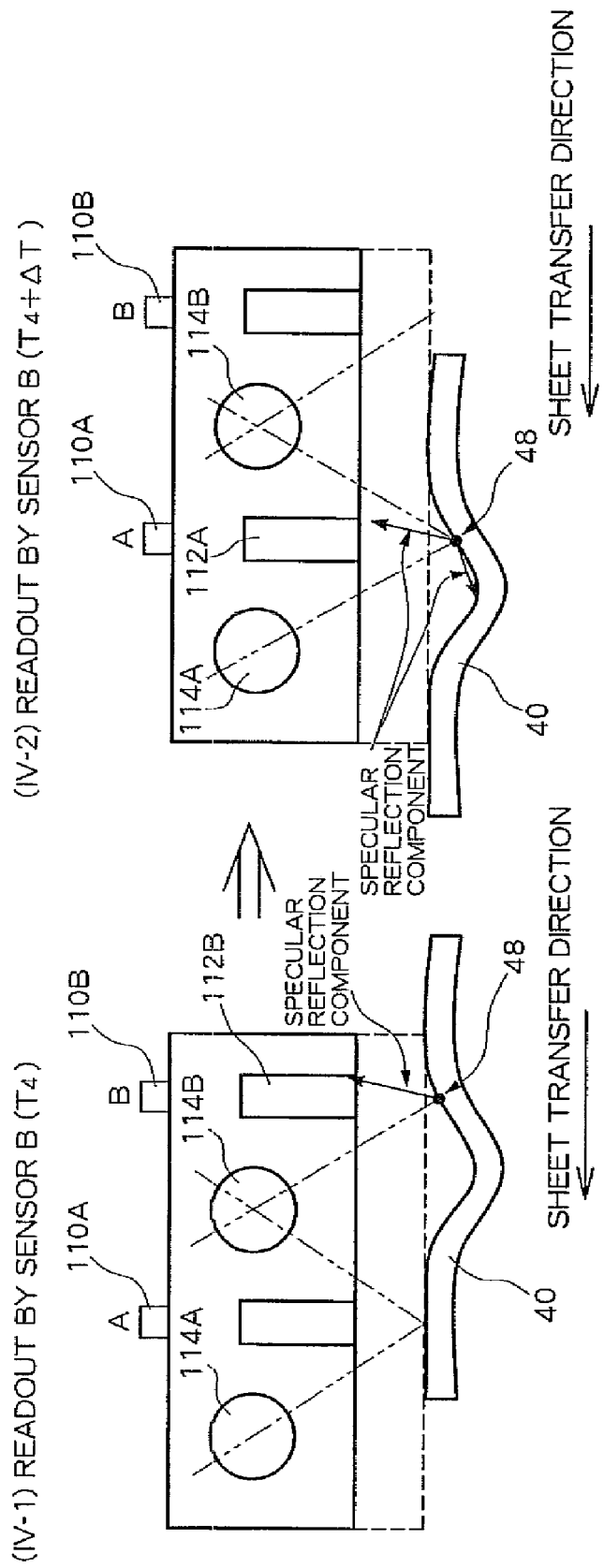
FIG. 8 is a diagram for explaining an illumination state in which a trailing edge of the flexural region on the sheet is read by each sensor.

FIG. 8 shows an illumination state in which a trailing edge 48 of the flexural region is read after the time has further elapsed. When the trailing edge 48 is read by the line sensor 110B (a state IV-1), contrary to the leading edge 44, a specular reflection component of light from the light source 114B obtained at the trailing edge 48 travels in a direction closer to the image-forming optical system 112B than a direction of the specular reflection component obtained at the flat region. Therefore, the output signal of the line sensor 110B has a level higher than that of the output signal obtained when the line sensor 110B reads the leading edge 44. Meanwhile, when the trailing edge 48 is read by the line sensor 110A (a state IV-2), directions of specular reflection components of light from the light sources 114A and 114B obtained at the trailing edge 48 are symmetric with those of the specular reflection components obtained in the stage of FIG. 6 where the line sensor 110A reads the leading edge 44.

As described above, the line sensor 110A reads a position symmetrically illuminated from both sides of the position by the light sources 114A and 114B which are equal in light-emitting intensity. As a result, a temporal waveform of the output signal of the line sensor 110A during a period in which the line sensor 110A reads the flexural region from the leading edge via the midsection to the trailing edge has symmetry between former and latter portions of the waveform relative to a time when the line sensor 110A reads the midsection 46 of the flexural region (which stands on the assumption that a shape of the flexural region is symmetric with respect to the midsection 46). Meanwhile, the level of the output signal of the line sensor 110B becomes lower than the output signal level of the line sensor 110A at the leading edge 44 of the flexural region, and becomes higher than the output signal level of the line sensor 110A at the trailing edge 48.

Figure 9:
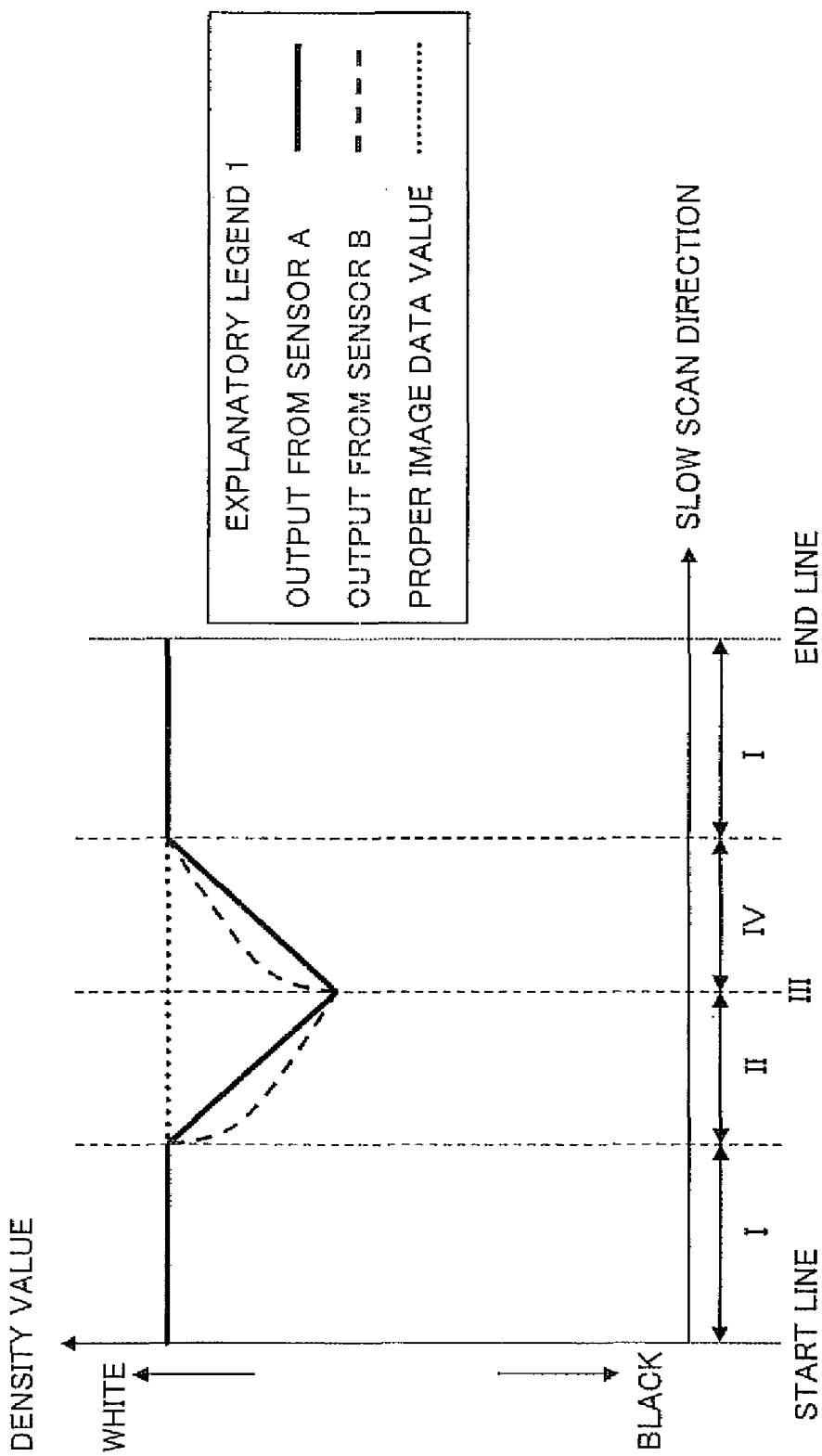
FIG. 9 schematically shows a pattern of change of an output signal from each sensor arising along the slow scan direction when the sheet has one flexural region.

Accordingly, when one flexural region is present on the sheet, the level of each output signal of the line sensors 110A and 110B (a gray level value) changes in the slow scan direction as schematically shown in FIG. 9. More specifically, while the flat region of the sheet is being read (the state I), the output signals of both the line sensor 110A and the line sensor 110B (which are simply denoted as "output from sensor A" and "output from sensor B" in FIG. 9, respectively) have equal values which function as the proper values representing an actual image on the sheet surface. Then, during a time period from when reading of the flexural region is started to when the midsection 46 of the flexural region is read (the state II), the output signal of the line sensor 110B is smaller than that of the line sensor 110A. After that, at a time when the midsection 46 of the flexural region is read (the state III), the output signals of both of the line sensors 110A and 110B become equal. In a following time period until the flat region is read during which readout of the remaining flexural region is complete (the state IV), the output signal of the line sensor 110B is greater than that of the line sensor 110A. Then, upon starting of readout of the flat region (the state I), the output signals of the sensors 110A and 110B again become equal in level.

The example in which one flexural region is present on the single document sheet has been described above. When multiple flexural regions are contained in the single document sheet, signal patterns similar to those illustrated in FIG. 9 are repeated a number of times corresponding in number to the number of flexural regions.

In this exemplary embodiment, for example, the output signal of the line sensor 110A is corrected by utilizing the relationship between outputs from the two line sensors 110A and 110B as described above, to thereby generate an image signal in which effects caused by the flexural deformation are compensated. Because the focal point 120A of the line sensor 110A is illuminated from both sides of the image-forming optical system 112A, a shadow is less likely to appear than in the case of that appearing when the focal point 120A is illuminated from only one side. Accordingly, the signal which is output from the line sensor 110A is an image signal in which the influence of the shadow is suppressed. In this exemplary embodiment, the image signal output from the line sensor 110A is corrected for components which are introduced into the image signal due to the effect of flexural deformation.

Figure 10:
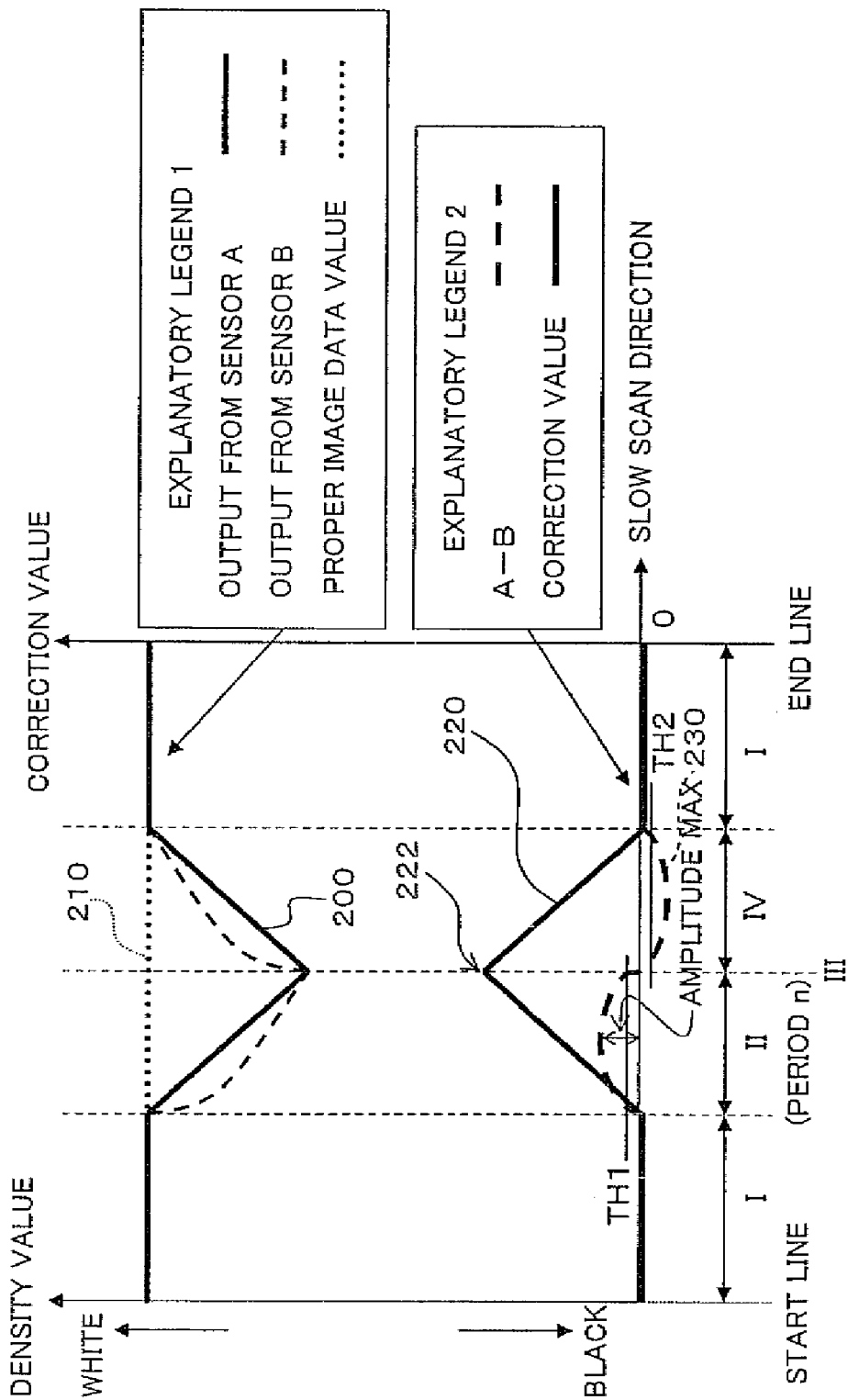
FIG. 10 is a drawing for explaining a correction signal applied to the output signal of each sensor when the sheet has one flexural region.

As shown in FIG. 10, the level of an output signal 200 of the line sensor 110A is reduced in the flexural region in the shape of the letter V in relation to data values 210 of the proper image signal. In this exemplary embodiment, correction may be performed by using a correction signal pattern 220 formed in the shape of an inverted letter V to cancel the V-shaped level reduction. The correction signal pattern 220 is generated, for example, by reference to a difference signal 230 representing a difference between an average value of signals which are output from the line sensor 110A for each fast scanning line (hereinafter referred to as "a signal A") and an average value of signals which are output from the line sensor 110B for each fast scanning line (hereinafter referred to as "a signal B").

(Although the difference is obtained by deducting the signal B from the signal A in the example depicted in FIG. 10, an inverse deduction may be performed to obtain the difference). In the description below, the fast scanning line (i.e. a scanning line for reading along the fast scan direction) is simply referred to as a line. The difference signal 230 represents the difference between output signals obtained by reading the same line on the sheet surface. During the time period in which the flat region of the sheet 40 is read (the state I), because the signals A and B are equal in level, the level of the difference signal 230 is substantially zero. During the time period from when reading of the flexure leading edge is started to when the flexure midsection 46 of is read (the state II), because the signal A is greater than the signal B, the level of the difference signal 230 is positive. At the time when the flexure midsection 46 is read (the state III), because the signals A and B again become equal in level, the level of the difference signal 230 is substantially zero. In the following period from when the flexure midsection 46 is read to when the flexure trailing edge is read (the state IV), because the signal A is smaller than the signal B, the level of the difference signal 230 is negative. Then, at a time when the flat part is read again after passing the flexure trailing edge, the level of the difference signal 230 returns to substantially zero again (the state I).

Here, although various types of flexural deformation will appear on a document sheet, each type of flexural deformation may be represented by a set of the width of a flexural region and the top height of the flexural region relative to a flat region of the document sheet. Then, a width and a maximum height of the V-shaped correction signal pattern 220 are respectively equal to the width and the maximum depth of the signal A having a V-shaped waveform, and correspond to the width and the top height of the flexural region. Meanwhile, the length of one cycle period of the difference signal 230 (i.e. a time period from the start of the state II to the end of the state IV) matches the length of a period during which the sensor unit 100 is reading the flexural region, and corresponds to the time width of the V-shaped correction signal pattern 220. The maximum amplitude of the difference signal 230 becomes greater as the maximum value 222 of the correction signal pattern 220 increases. It can be seen from the above-described fact that when both the cycle period and the amplitude of the difference signal 230 are found, the correction signal pattern 220 corresponding to the combination of the cycle period and the amplitude is determined. In this exemplary embodiment, for example, information of correction signal patterns corresponding to various types of flexural deformation having different widths and heights in addition to combinations of the cycle period and the maximum amplitude of the difference signals 230 corresponding to the respective correction signal patterns are previously obtained through experiments, simulations, or other means, and the output signal of the line sensor 110A is corrected by reference to the obtained information.

Next, by reference to FIG. 11, an example of a signal-processing system in the image-reading apparatus according to this exemplary embodiment will be described. The line sensors 110A and 110B in this signal-processing system correspond to the line sensors in the sensor unit 100 exemplified in FIG. 3 and other drawings.

In the signal-processing system, the output signals of the line sensors 110A and 110B are respectively processed through publicly-known analog signal processing, such amplification or waveform shaping in analog signal processing circuits 130A and 130B, and the processed output signals are converted into respective digital signals by A/D converters 140A and 140B. Shading compensation circuits 150A and 150B perform publicly-known shading compensation processing on the digital signals which are respectively output from the A/D converters 140A and 140B. An output signal from the shading compensation circuit 150B is delayed by a predetermined time $\Delta T$ in a delay circuit 160, to thereby render the output signal from the shading compensation circuit 150B as a signal representing the same line from which the output signal of the shading compensation circuit 150A is obtained. Both output from the shading compensation circuit 150A and output from the shading compensation circuit 150B are input into a processor 300.

The processor 300, which is an apparatus for performing digital computation, executes a correction processing program 312 stored in a nonvolatile memory 310 to implement the above-described correction processing. A specific example of processing steps in the correction processing program 312 will be described below.

Figures 12, 13:
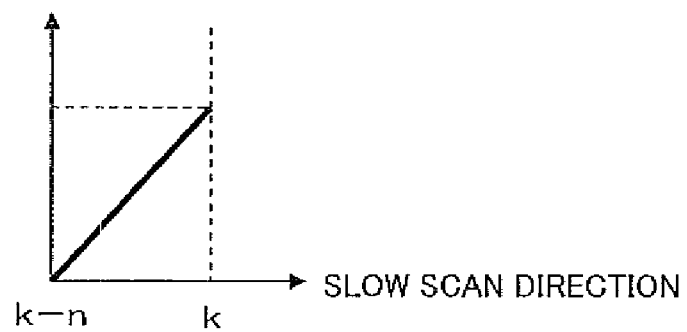
FIG. 12 shows example data contents in a correction table.
FIG. 13 is a diagram for explaining correction information contained in the correction table.

The nonvolatile memory 310 may be a ROM (Read Only Memory), a flash memory, a hard disk, or the like. The nonvolatile memory 310 stores, in addition to the correction processing program 312, a correction table 314 in which information on the correction signal patterns are retained. In the correction table 314, as shown in FIG. 12, information of a correction signal pattern is retained for each combination of the cycle period and the amplitude. In FIG. 12, alphabetical letters a, b, ... represent ranges of the cycle period, such as 30 to 40 milliseconds and 40 to 50 milliseconds. Meanwhile, Greek letters $\alpha$ (alpha), $\beta$ (beta), ... represent ranges of the amplitude. It should be noted that because the pattern of a change in the signal A caused by flexural deformation is symmetrical between the first half and the latter half of flexural deformation, a correction signal pattern can be determined from information of the first half of flexural deformation. In view of this, a time period from when the difference signal 230 as illustrated in FIG. 10 exceeds a threshold value 1 (TH1) to when the difference signal 230 again falls below the threshold value 1 (TH1) is used as the "cycle period" (which is depicted as "period n" in FIG. 10. Here, the threshold value 1 (TH1) is a value previously obtained from an experiment or another method and prestored in the nonvolatile memory 310 or other devices. The threshold 1 (TH1) is zero or a positive value close to zero. Further, reference letter n represents the number of lines which are present in the first half of flexural deformation, and the maximum value of the difference signal 230 (which is depicted as "amplitude MAX" in FIG. 10) is used as the "amplitude." Further, in this example, information to be stored in the correction table 314 is defined to be a correction signal pattern corresponding to the first half of flexural deformation as shown in FIG. 13. The information of the correction signal pattern illustrated in FIG. 13 represents a correction value for each one of n lines present in the first half of flexural deformation. A correction signal pattern obtained by horizontally flipping the correction signal pattern for the first half may be used as a correction signal pattern for the latter half of flexural deformation.

Figure 11:
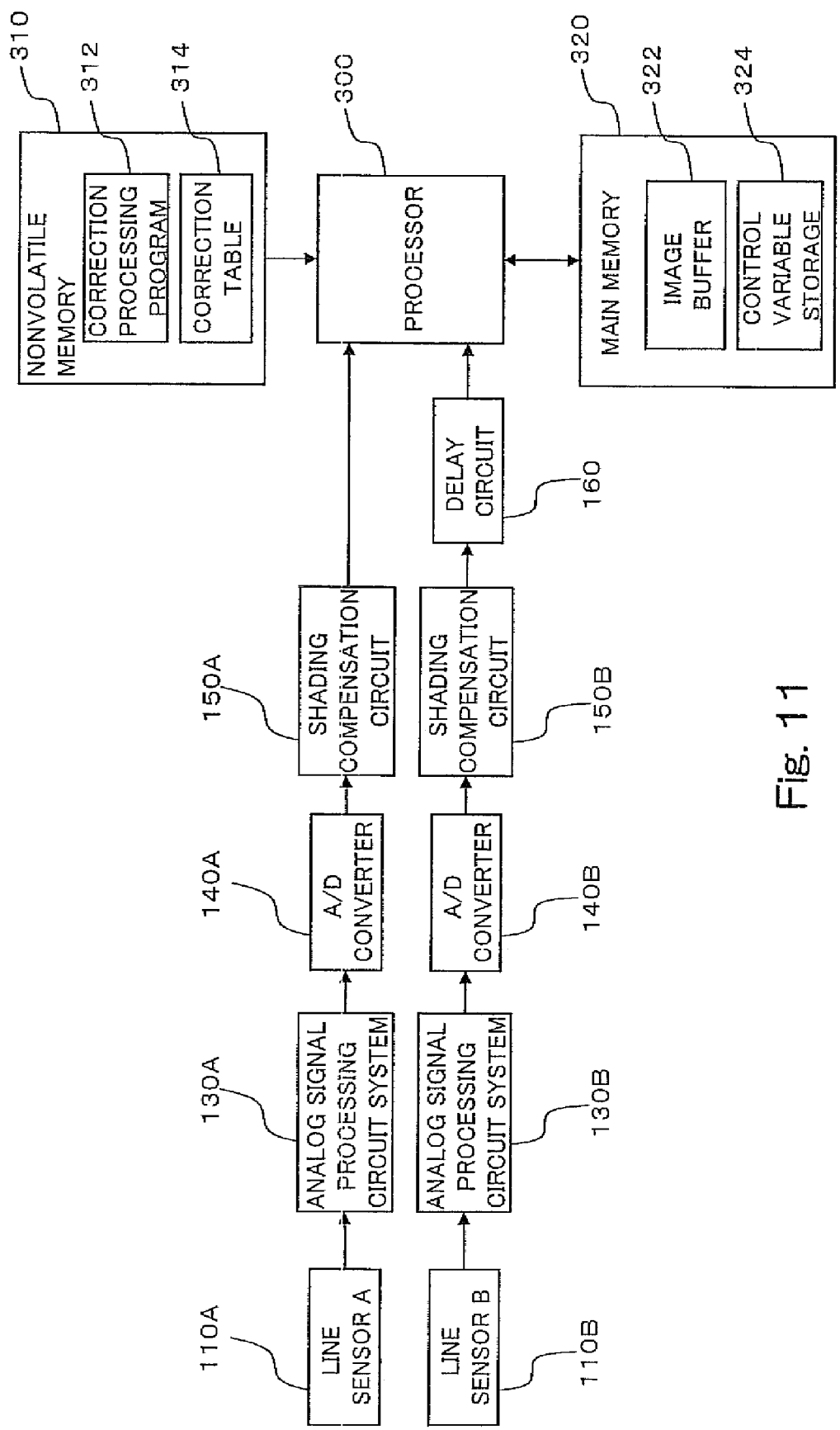
FIG. 11 shows an example of a signal-processing system in the image-reading apparatus according to the exemplary embodiment.

Returning to the description with reference to FIG. 11, a main memory 320 is a storage device for supplying a work area used for computation processing performed by the processor 300. The main memory 320 may be, for example, a semiconductor memory such as a RAM (Random Access Memory). Two areas designated as an image buffer 322 and a control variable storage unit 324 are contained in the main memory 320. The image buffer 322 is a buffer for accumulating read-out image data. The control variable storage unit 324 stores values of control variables which are used during execution of the correction processing program 312.

Next, by reference to FIGS. 14 to 17, a specific example of processing steps described in the correction processing program 312 will be described.

Figure 14:
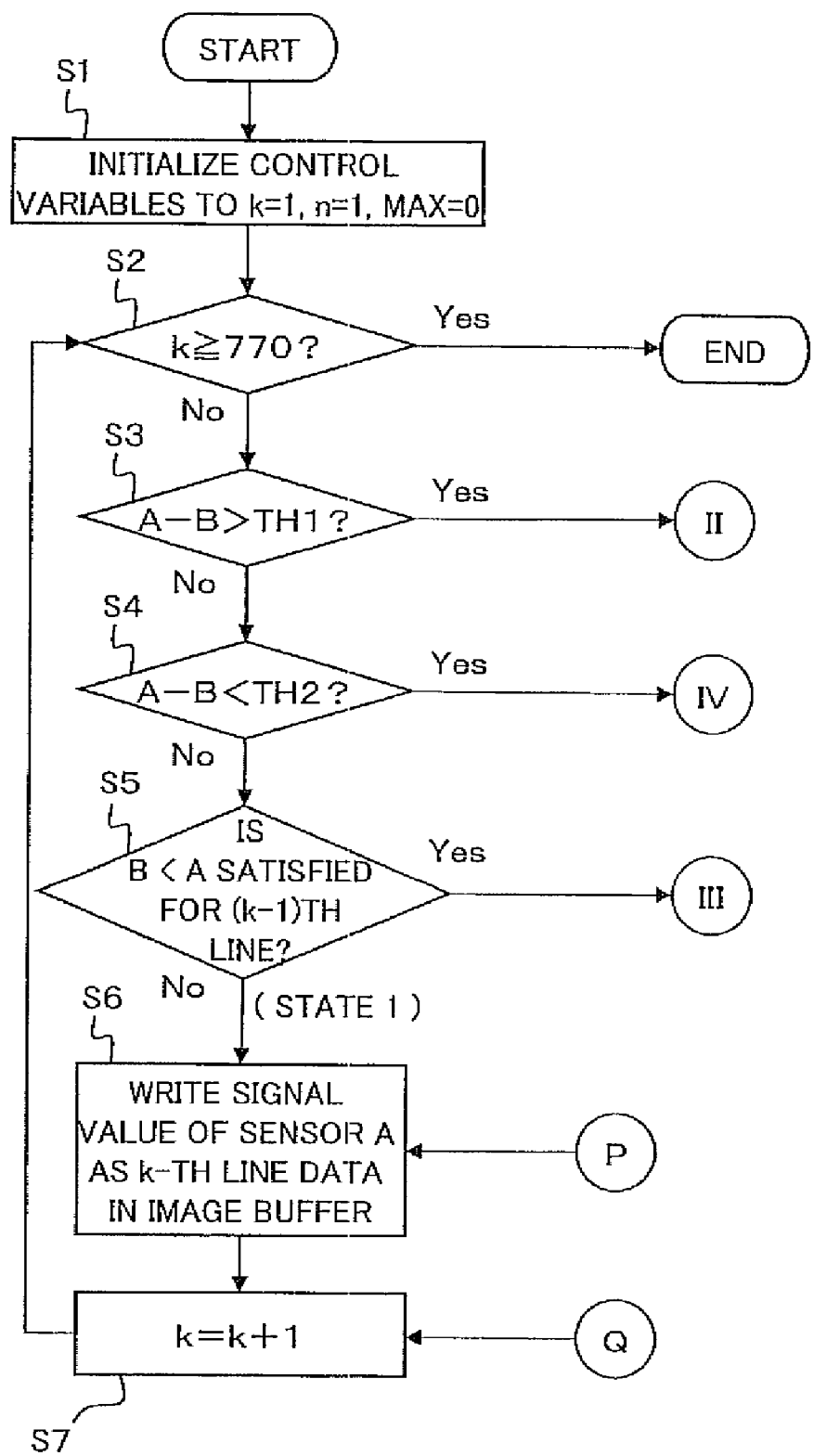
FIG. 14 shows a part of processing steps in a correction processing program.

According to the processing steps as shown in FIG. 14, upon starting of readout of a sheet, the processor 300 initializes a control variable k to 1, a control variable n to 1, and a control variable MAX to 0 (S1). The control variable k represents the number of lines counted from a sheet readout starting line to a present reading line (current line) in the slow scan direction. As a slow scan advances, the value of k is incremented. The control variable n represents the number of lines present from the leading edge of flexural deformation on a sheet to the present reading line. The control variable MAX is used for retaining an absolute value of the maximum value of the difference signal 230. In this example, the lines present from the starting line to the ending line of sheet slow scanning are assumed to number 770 lines. It should be understood that the specific number is described merely as one example. In the processing steps, the variable k is compared with 770 (S2), and when k becomes 770 or greater, completion of readout of the sheet is determined, thereby terminating the processing.

When k is smaller than 770, the processor 300 compares the levels between the signal A and the signal B to locate the present reading line from among the flat region (state I), the first half of the flexural region (state II), the midsection of the flexural region (state III), and the latter half of the flexural region on the sheet (S3 to S5).

Figure 15:
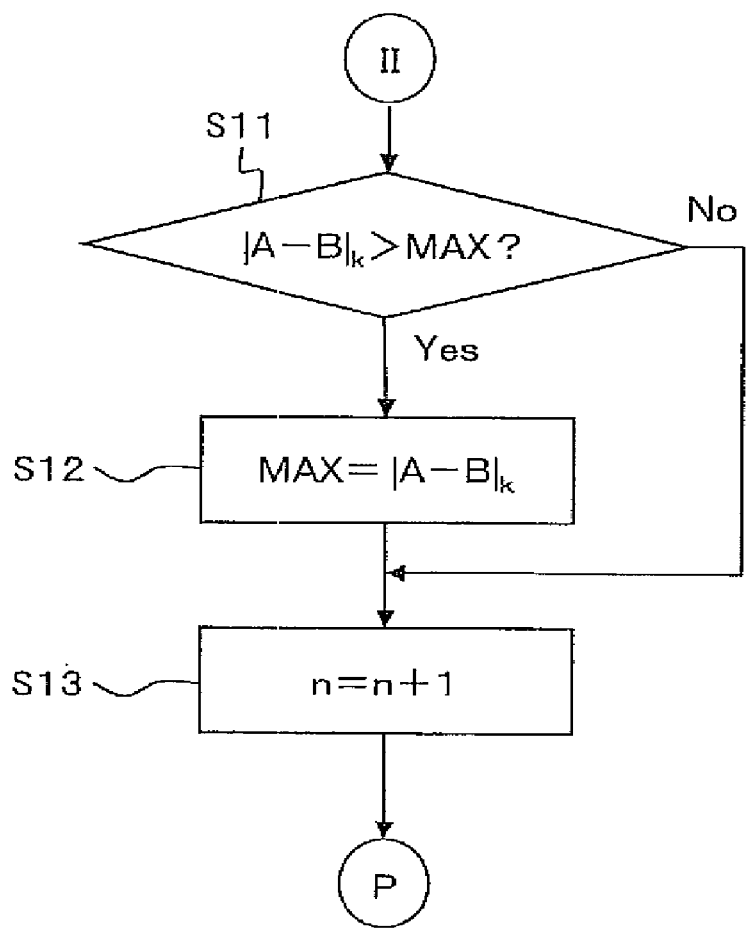
FIG. 15 shows another part of the processing steps in the correction processing program.
Figure 16:
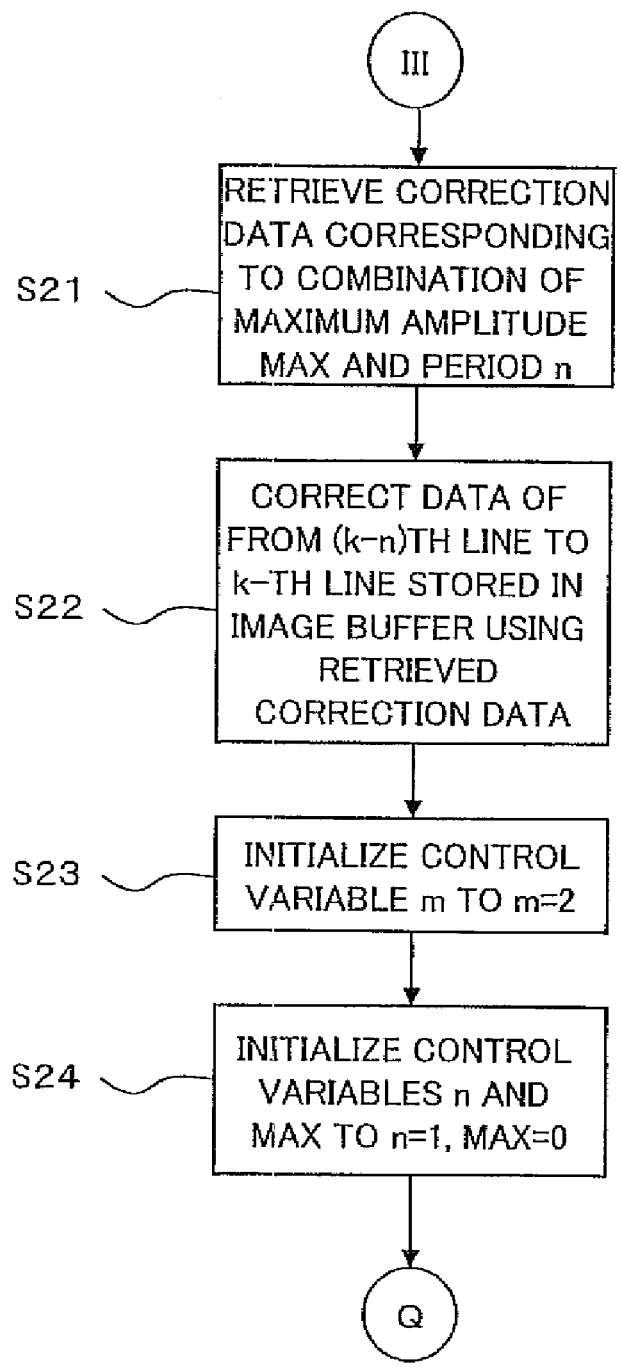
FIG. 16 shows still another part of the processing steps in the correction processing program.

More specifically, when a difference of (the signal A–the signal B) is greater than the threshold value 1 (TH1) (when yes is determined in step S3), the present reading line is determined as being located in the first half of the flexural region, and operation proceeds to processing steps shown in FIG. 15. When the difference signal (A–B) is smaller than a threshold value 2 (TH2) (when yes is determined in step S4), the present reading line is determined as being located in the latter half of the flexural region, and operation proceeds to processing steps shown in FIG. 17. Here, the threshold value 2 (TH2) is a value previously obtained from an experiment or another method and prestored in the nonvolatile memory 310 or another device. The threshold value 2 (TH2) is zero or a negative value close to zero. When the difference signal (A–B) is situated between the threshold values 1 and 2 (when no is determined in both step S3 and step S4; i.e. when the signal A is substantially equal to the signal B), in view of the two possibilities that the present reading line is located in the flat region and that the present reading line is located in the midsection of the flexural region, the two possibilities are discriminated in step S5. Specifically, in step 5, a determination is made as to whether or not the signal A is greater than the signal B with respect to an immediately preceding line (the (k−1)th line). When the signal A is determined to be greater, because the first half of the flexural region is read on the (k−1)th line, it can be determined that the present line (the k-th line) is at the midsection of the flexural region. In this case, operation proceeds to processing steps shown in FIG. 16. When the signal A is equal to the signal B on the (k−1)th line, the present line is determined to be located in the flat region (the state I), and operation proceeds to step S6. In step S6, the processor 300 writes the output signal of the line sensor 110A representing the present line into the image buffer 322 as the k-th line data (S6), and increments the line number k by one (S7). Then, operation returns to step S2.

In the above-described example, determination in step S3 is conducted for each line, and operation proceeds to the processing steps for the state II (the processing steps shown in FIG. 15) after an affirmative result (yes) is determined only once. However, this configuration is provided as one example. For example, taking into account signal noise or other factors, there may be adopted a configuration where operation proceeds to the processing steps for the state II after the affirmative result is successively determined with respect to a predetermined first number of lines. Likewise, transition from step S4 to the processing steps for the state IV may be performed as described above.

Further, although it has been described that ending of the state II is determined when the difference signal (A–B) which has once exceeded the threshold value (TH1) again becomes smaller than or equal to the threshold value 1 (TH1) only once, such a manner of determination is described merely as an example. Taking into account the signal noise or other factors, the ending of the state II may be determined only after a negative result in step S3 is successively determined with respect to a predetermined second number of lines. Likewise, determination of ending of the state IV (step S4) may be conducted as described above.

When a determination result of yes is obtained in step S3, as shown in FIG. 15, an absolute value |A–B| of the difference signal 230 associated with the present line k is compared with the variable MAX (S11). At a point in time when transition from the state I to the state II is made, the difference signal 230 is no longer equal to zero as shown in FIG. 10, and the absolute value of the difference signal 230 becomes greater than the initial value 0. Accordingly, the determination result of yes is obtained in step S11. In this case, the processor 300 substitutes the absolute value |A–B| of the difference signal 230 associated with the present line k for a value of the variable MAX (S12). Then, after incrementing by 1 the variable n that represents the number of lines counted from the leading edge of the flexural region (S13), in step S6 the processor 300 writes the output signal of the line sensor 110A obtained at the present line as the k-th line data into the image buffer 322. Then, operation returns via step S7 to step S2.

As can be seen from FIG. 10, during a time period until reaching the state III after the transition from the state I to the state II, the absolute value of the difference signal 230 is gradually increased as the slow scan progresses, and, after reaching its peak value, the absolute value is gradually reduced. Thus, the value of the variable MAX is successively overwritten by a new absolute value of the difference signal 230 until the absolute value of the difference signal 230 reaches its peak value. After reaching the peak value, the value of the variable MAX substituted by the peak value is retained. Meanwhile, the variable n is successively incremented by 1 as the slow scan progresses.

Thereafter, at a point in time when the midsection 46 of the flexural region is read, the signal A becomes equal to the signal B, or the difference signal (A–B) becomes smaller than the threshold value 1 (TH1) and greater than the threshold value 2 (TH2) or becomes equal to the threshold value 1 or 2. In addition, the determination result of yes is obtained in step S5. At this point in time, the variable n represents the number of lines existing from the leading edge to the midsection of the flexural region, and corresponds to the width of the V shape of the correction signal pattern 220. Meanwhile, the variable MAX shows the peak absolute value of the difference signal 230 corresponding to the maximum value of the correction signal pattern 220. In the processing steps of FIG. 16, the processor 300 retrieves from the correction table 314 the correction signal pattern associated with the combination of the variables n (the cycle period) and MAX (the amplitude) at the above-described point in time (S21), and corrects the image data of from the (k−n)th line (the leading edge of the flexural region) to the k-th line (the present line; i.e. the midsection of the flexural region) retained in the image buffer 322 using the retrieved correction signal pattern (S22). Here, for example, each correction value in the correction signal pattern from the (k−n)th line to the k-th line is added to the image data covering the range from the (k−n)th line to the k-th line. Then, a control variable m is initialized to 2 (S23). The control variable m is a variable for locating a line number in the correction signal pattern to be referenced in the processing for the state IV. More specifically, because the correction signal pattern from the leading edge to the midsection of the flexural region retained in the correction table 314 is horizontally flipped, and the flipped correction signal pattern is used in the state IV, the variable m is used to specify the line whose value is used in the pattern. Then, after initializing the control variable n to 1 and MAX to 0 (S24), operation returns via step S7 to step S2.

Figure 17:
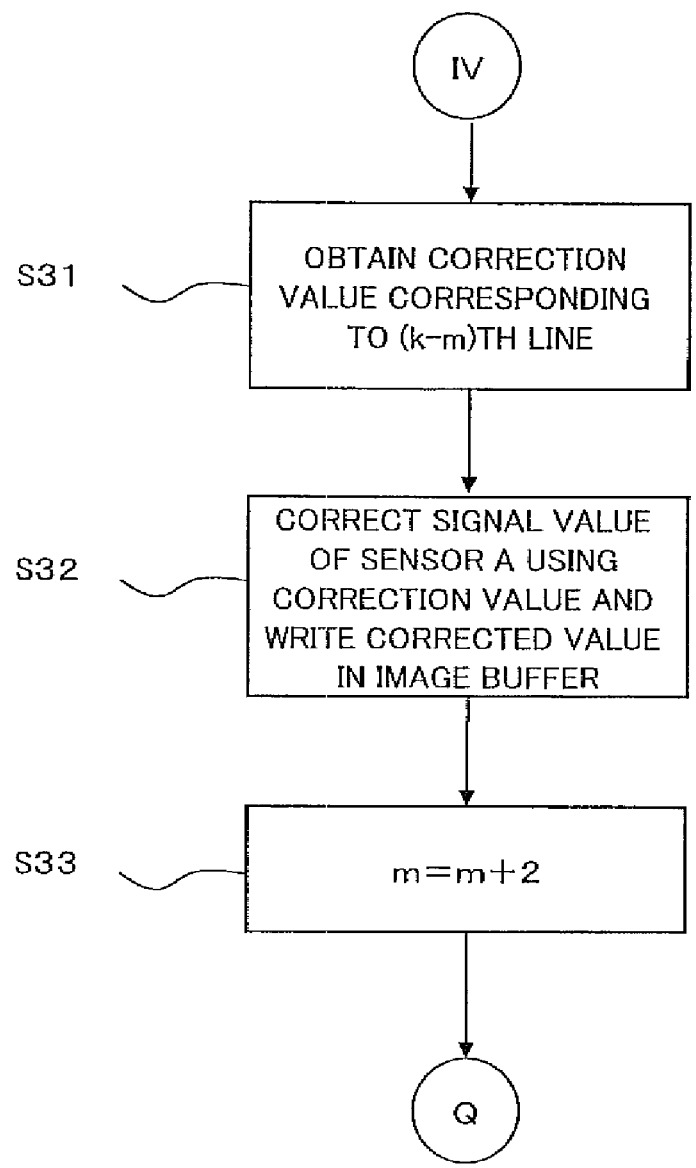
FIG. 17 shows still another part of the processing steps in the correction processing program.

In the processing for a line that follows the state III (in the state IV), yes is determined in step S4, and operation processing to the processing steps shown in FIG. 17. In the processing steps of FIG. 17, a value corresponding to the (k−m)th line in the correction data retrieved in step S21 is read out (S31), and the read-out value is used to correct the present output signal of the line sensor 110A (for example, by adding the read-out correction value to the output signal). Then, a result of the correction is written as the k-th line data into the image buffer 322 (S32). Next, the variable m is incremented by 2 (S33), and operation returns via step S7 to step S2. Because the variable m is incremented by 2 every time the present line number k is incremented by 1, a value of (k−m) becomes a number which indicates a line located at a position symmetric to the present line k about the maximum value 222. A correction value associated with the number (k−m) is read from the information of the correction signal pattern, and the read value can be used as the correction value corresponding to the present line k.

Subsequent to the transition to the state IV, when the present line k reaches the trailing edge of the flexural region, the signal A again becomes equal to the signal B, or the difference signal (A−B) again becomes greater than the threshold value 2 (TH2) and smaller than the threshold value 1 (TH1) or becomes equal to the threshold value 1 or 2. In addition, no is determined in step S5. Therefore, operation proceeds to step S6 (i.e. the state I is resumed). When multiple flexural regions are present on the sheet, the above-described cycle of the states of I->II->III->IV->I is repeated for each of the flexural regions.

Image data in which the effect of the flexural region is compensated can be obtained by repeating the processing steps as described above until the slow scan reaches the final line. The image-reading apparatus may include a circuit or a program for performing scaling, binarization, or other processing operations on the compensated image data obtained as described above.

In order to implement the above-described processing steps, the image buffer 322 may have a capacity for storing data of lines in a number equivalent to one-half of the maximum width of a possible flexural region or a greater capacity. This capacity can be previously determined through experiments or other techniques.

Although in the above-described process steps the correction signal pattern for the flexural region only from the leading edge to the midsection is stored in the correction table 314, and the correction signal pattern is horizontally flipped for use in correction for the time period from the midsection to the trailing edge of the flexural region, this configuration is described as merely an example. Alternatively, a correction signal pattern for the entire range from the leading edge to the trailing edge of the flexural region may be registered in the correction table 314, and correction may be performed by using the correction signal pattern covering the entire range of the flexural region.

Figure 18:
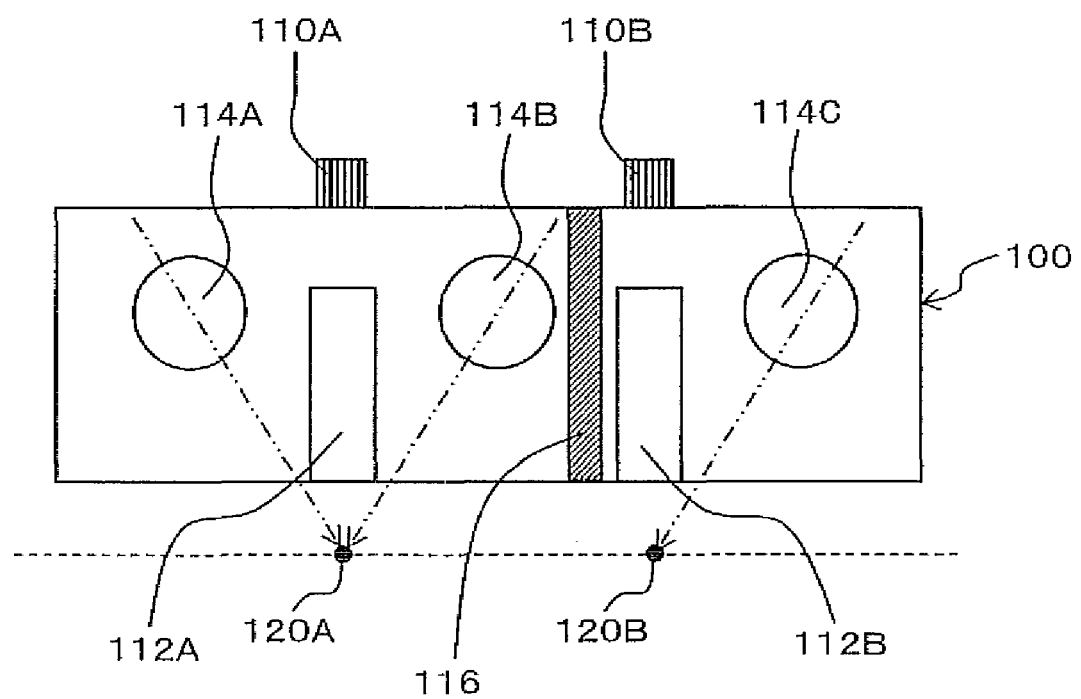
FIG. 18 shows another example configuration of the sensor unit.

The exemplary embodiment as described above is provided merely as an example. For example, the sensor unit 100 is not limited to the one shown in FIG. 3, and another sensor unit 100 as shown in FIG. 18 may be used. The sensor unit 100 shown in FIG. 18 includes a light-blocking wall 116 disposed between the light source 114B and the image-forming optical system 112B, to thereby prevent light emitted by the light source 114B from reaching the focal point 120B of the image-forming optical system 112B. As a consequence of provision of the light-blocking wall 116, a light source 114C is provided on a side of the image-forming optical system 112B opposite the light source 114B, thereby causing the focal point 120B to be illuminated only by the light source 114C. In this case, patterns of change of the signals A and B occurring when the flexural region is read are symmetrically opposite the patterns illustrated in FIG. 10 with respect to the midsection of the flexural region. Also in this case, a correction signal pattern may be found from the change in the difference signal (A−B) in a manner similar to that performed in the above-described exemplary embodiment, and the signal A may be corrected by using the correction signal pattern. However, when the single light source 114B is shared to illuminate both the focal points 120A and 120B as shown in FIG. 3, the number of light sources can be reduced.

Further, it has been described in the exemplary embodiment that the focal point 120A is illuminated from both sides by the two light sources, whereas the focal point 120B is illuminated from one side by one light source. However, such a configuration is described as merely an example, and there may be adopted, for example, an illumination mechanism in which both of the focal points 120A and 120B are illuminated from both sides in the slow scan direction. When this illumination mechanism is adopted, there may be employed a configuration wherein a ratio between an intensity of illumination from one side and that from the other side varies between the focal point 120A and the focal point 120B. In this configuration, because the pattern of the change in the signal A differs from that in the signal B during the period in which the flexural region is read, the difference signal (A−B) changes similarly to that shown in FIG. 10, thereby enabling application of the idea of the exemplary embodiment to the case where the above-described illumination mechanism is adopted.

Still further, processing details described in the correction processing program 312 according to the above-described exemplary embodiment may be implemented by means of a hardware circuit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image-reading apparatus, comprising:
a sheet transfer unit that transfers a sheet;
a first light-receiving device that receives light reflected from the sheet;
a second light-receiving device disposed a predetermined distance from the first light-receiving device along a transfer direction in which the sheet transfer unit transfers the sheet;
a first lighting unit that illuminates a readout position to be read by the first light-receiving device at a first ratio between an intensity of illumination from one side along the transfer direction and an intensity of illumination from the other side along the transfer direction;
a second lighting unit that illuminates a readout position to be read by the second light-receiving device at a ratio, which differs from the first ratio, between an intensity of illumination from one side along the transfer direction and an intensity of illumination from the other side along the transfer direction;
a delay unit that delays one of a first signal which is output from the first light-receiving device and a second signal which is output from the second light-receiving device to correct a delay caused by a displacement between the readout position associated with the first signal and the readout position associated with the second signal;
a correction signal generation unit that generates a correction signal based on a difference between the first signal and the second signal, one of which has been delayed by the delay unit; and
a correcting unit that corrects at least one of the first signal and the second signal using the correction signal generated by the correction signal generation unit.

2. The image-reading apparatus according to claim 1, further comprising:
a difference signal generation unit that generates, for each scanning operation, a difference between an average value of the first signal being output during the scanning operation and an average value of the second signal being output during the scanning operation; wherein
the correction signal generation unit generates the correction signal on the basis of both a length of a time period from when a value of the difference generated by the difference signal generation unit reaches or exceeds a threshold value to when the value falls below or again reaches the threshold value and a maximum value of magnitude of the difference during the time period.

3. The image-reading apparatus according to claim 2, further comprising:
a memory that stores, for each combination of the length of the time period from when the value of the difference generated by the difference signal generation unit reaches or exceeds the threshold value to when the value falls below or again reaches the threshold value and the maximum value of magnitude of the difference during the time period, information of the correction signal corresponding to the combination; wherein
the correction signal generation unit retrieves the information of the correction signal corresponding to the combination of the length of the time period from when the value of the difference generated by the difference signal generation unit reaches or exceeds the threshold value to when the value falls below or again reaches the threshold value and the maximum value of magnitude of the difference during the time period, and generates the correction signal by reference to the retrieved information.

4. The image-reading apparatus according to claim 1, further comprising:
a difference signal generation unit that generates, for each scanning operation, a difference between an average value of the first signal being output during the scanning operation and an average value of the second signal being output during the scanning operation; wherein
the correction signal generation unit generates the correction signal by reference to both a length of a time period from when the difference generated by the difference signal generation unit successively reaches or exceeds a threshold value with respect to a first number of scanning lines to when the difference falls below or again reaches the threshold value with respect to a second number of scanning lines and a maximum value of magnitude of the difference during the time period.

5. The image-reading apparatus according to claim 1, wherein:
the first lighting unit comprises a light source disposed between the first light-receiving device and the second light-receiving device in the transfer direction; and
the light source is also used as a light source of illumination from the second lighting unit.

6. An image-reading apparatus, comprising:
a sheet transfer unit that transfers a sheet;
a first light-receiving device that receives light reflected from the sheet;
a second light-receiving device disposed a predetermined distance from the first light-receiving device along a transfer direction in which the sheet transfer unit transfers the sheet;
a first lighting unit that illuminates a readout position to be read by the first light-receiving device from both sides along the transfer direction;
a second lighting unit that illuminates a readout position to be read by the second light-receiving device from one side along the transfer direction;
a delay unit that delays one of a first signal which is output from the first light-receiving device and a second signal which is output from the second light-receiving device to correct a delay caused by a displacement between the readout position associated with the first signal and the readout position associated with the second signal;
a correction signal generation unit that generates a correction signal by reference to a difference between the first signal and the second signal, one of which has been delayed by the delay unit; and
a correcting unit that corrects at least one of the first signal and the second signal by using the correction signal generated by the correction signal generation unit.

7. An image-reading method comprising:
transferring a sheet;
receiving light reflected from the sheet at a first light-receiving device;
receiving light reflected from the sheet at a second light-receiving device disposed a predetermined distance from the first light-receiving device along a transfer direction in which the sheet is transferred;
illuminating a readout position to be read by the first light-receiving device at a first ratio between an intensity of illumination from one side along the transfer direction and an intensity of illumination from the other side along the transfer direction;
illuminating a readout position to be read by the second light-receiving device at a ratio, which differs from the first ratio, between an intensity of illumination from one side along the transfer direction and an intensity of illumination from the other side along the transfer direction;

delaying one of a first signal which is output from the first light-receiving device and a second signal which is output from the second light-receiving device to correct a delay caused by a displacement between the readout position associated with the first signal and the readout position associated with the second signal;

generating a correction signal by reference to a difference between the first signal and the second signal, one of which has been delayed; and correcting at least one of the first signal or the second signal by using the generated correction signal.

8. An image-reading method comprising:

transferring a sheet;

receiving light reflected from the sheet at a first light-receiving device;

receiving light reflected from the sheet at a second light-receiving device disposed a predetermined distance from the first light-receiving device along a transfer direction in which the sheet is transferred;

illuminating a readout position to be read by the first light-receiving device from both sides along the transfer direction;

illuminating a readout position to be read by the second light-receiving device from one side along the transfer direction;

delaying at least one of a first signal which is output from the first light-receiving device and a second signal which is output from the second light-receiving device to correct a delay caused by a displacement between the readout position associated with the first signal and the readout position associated with the second signal;

generating a correction signal by reference to a difference between the first signal and the second signal, one of which has been delayed; and correcting at least one of the first signal and the second signal by using the generated correction signal.

* * * * *